(12) United States Patent
Van Lancker

(10) Patent No.: US 6,516,736 B1
(45) Date of Patent: Feb. 11, 2003

(54) PONTOON WATERCRAFT AND METHOD FOR MAKING SAME

(75) Inventor: Peter Van Lancker, Palm City, FL (US)

(73) Assignee: Genmar IP LLC, Minneapolis, MN (US)

( * ) Notice: Subject to any disclaimer, the term of this patent is extended or adjusted under 35 U.S.C. 154(b) by 0 days.

(21) Appl. No.: 09/723,867

(22) Filed: Nov. 28, 2000

(51) Int. Cl.⁷ .................................................. B63B 1/00
(52) U.S. Cl. ........................ 114/61.1; 114/357; 114/292
(58) Field of Search ................................ 114/357, 362, 114/61.1, 292, 61.15

(56) References Cited

U.S. PATENT DOCUMENTS

| | | | |
|---|---|---|---|
| 3,090,339 A | * 5/1963 | Carr | 114/61.1 |
| 3,600,733 A | * 8/1971 | Lippisch | 114/357 |
| 4,365,577 A | * 12/1982 | Heinrich | 114/267 |
| 4,418,634 A | 12/1983 | Gerbus | |
| 4,559,891 A | 12/1985 | Shorter, Jr. | |
| 4,694,770 A | * 9/1987 | Kitner et al. | 114/123 |
| 4,777,898 A | * 10/1988 | Faulkner | 114/61 |
| 4,858,369 A | 8/1989 | Collins | |
| 5,259,330 A | 11/1993 | Faulkner | |
| 5,316,701 A | * 5/1994 | Payne | 264/1.5 |
| 5,385,112 A | * 1/1995 | Dorris | 114/362 |
| 5,540,169 A | 7/1996 | Davis et al. | |
| 5,641,525 A | 6/1997 | Yakel | |
| 5,676,088 A | * 10/1997 | Blaisdell et al. | 114/357 |
| 5,911,187 A | 6/1999 | Sohm | |
| 5,988,087 A | 11/1999 | Pepper | |
| 6,374,763 B1 | 4/2002 | Hartman | |

* cited by examiner

Primary Examiner—Ed Swinehart
(74) Attorney, Agent, or Firm—Merchant & Gould P.C.

(57) ABSTRACT

A pontoon for floating a watercraft, wherein the pontoon has a skin forming a closed body, a foam coupled to the skin within the closed body, and integral features formed by the skin. The integral features may include a support structure for mounting a watercraft structure.

36 Claims, 5 Drawing Sheets

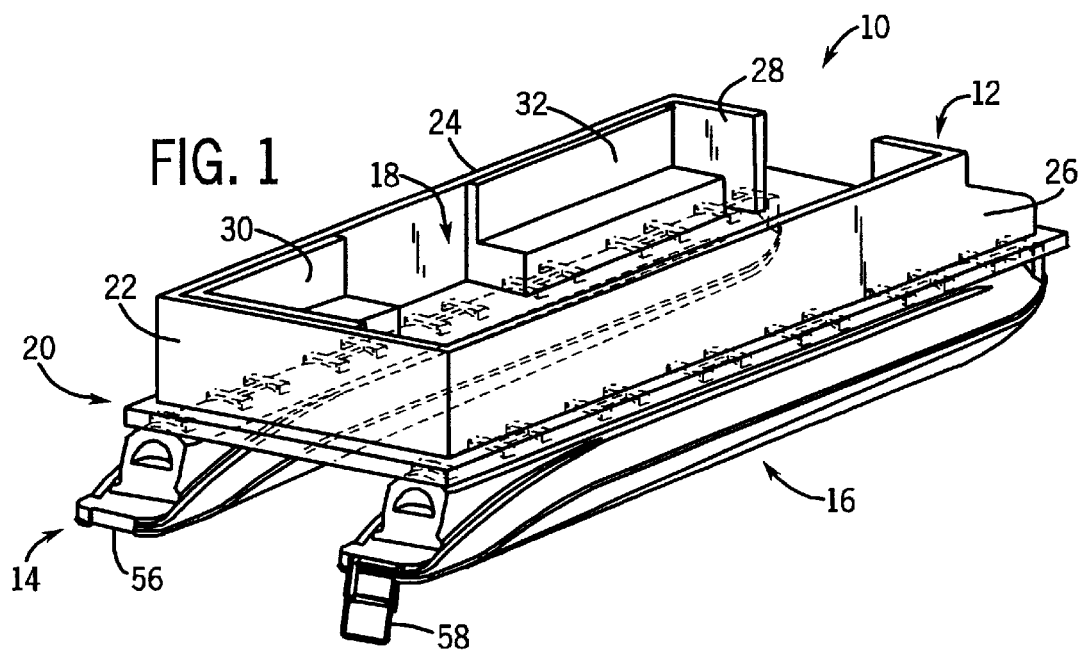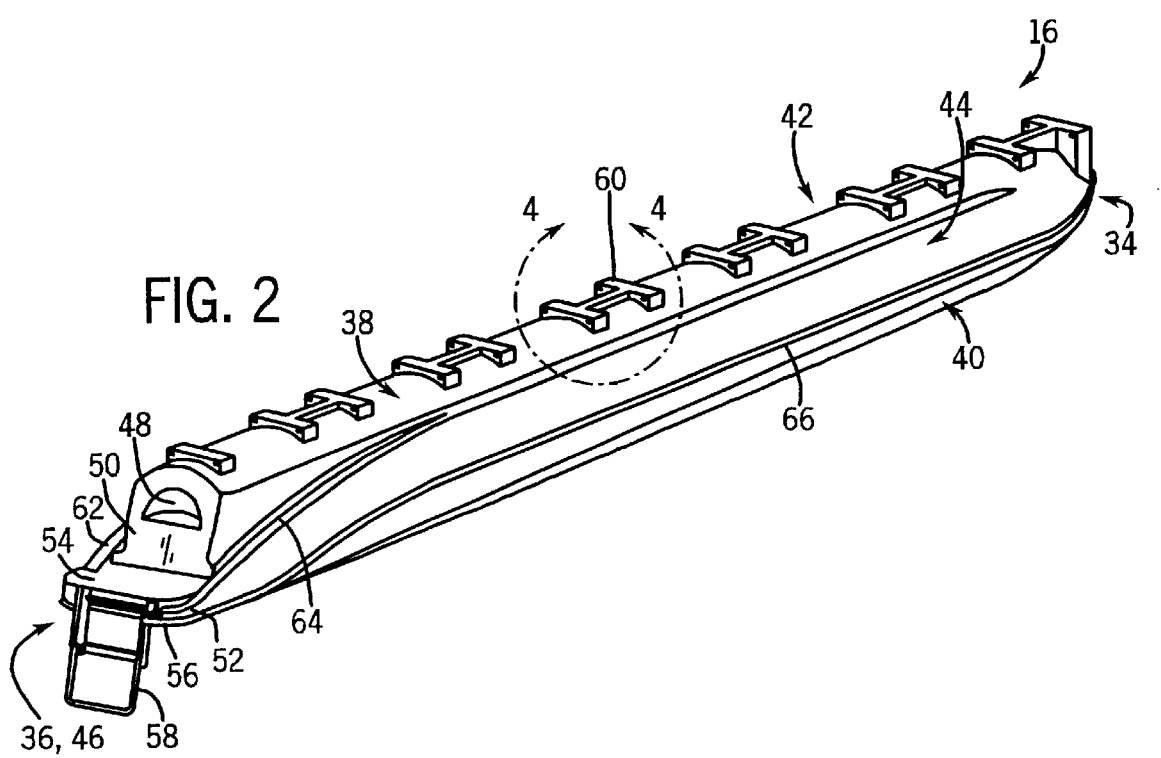

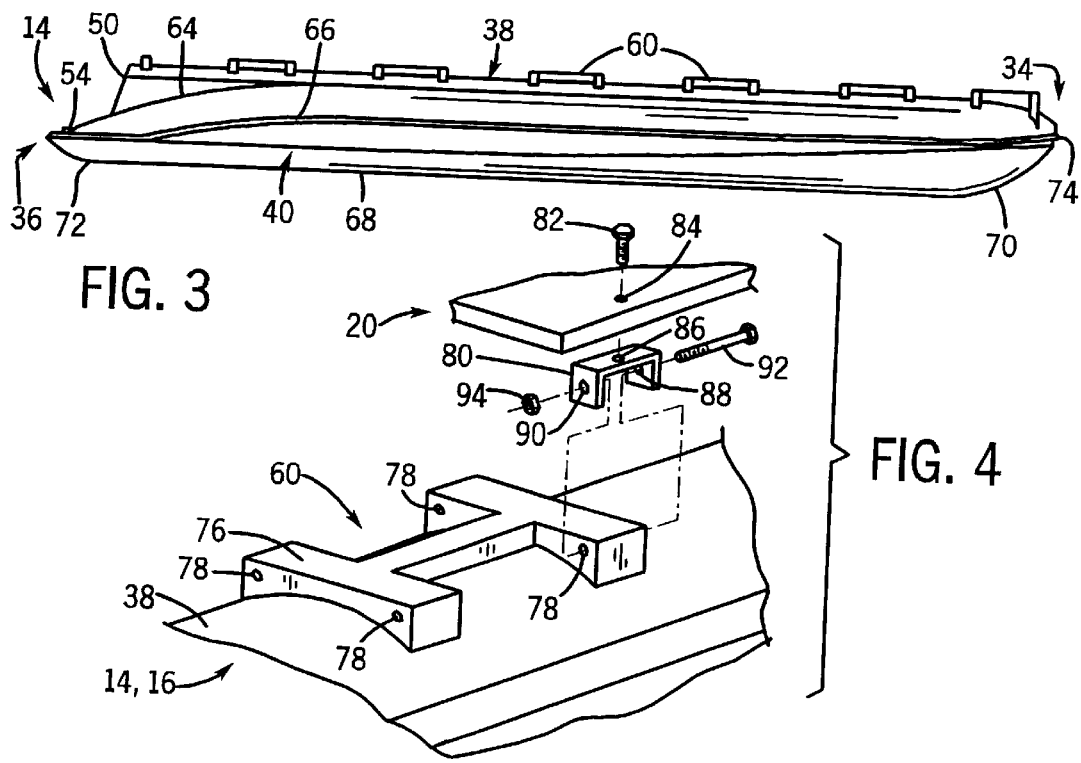
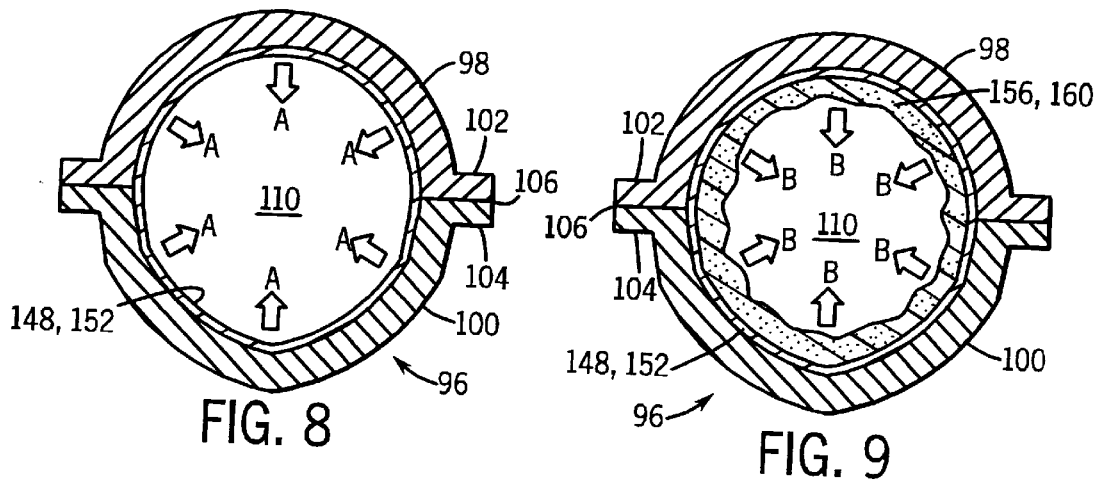
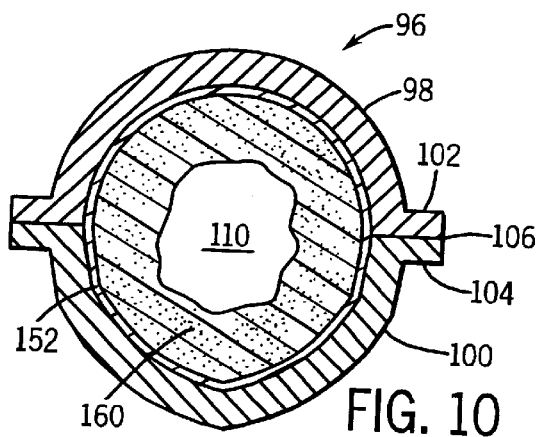

PONTOON WATERCRAFT AND METHOD FOR MAKING SAME

BACKGROUND OF THE INVENTION

1. Field of the Invention

The present invention relates generally to the field of pontoon watercraft, and flotation techniques for such watercraft. More particularly, the invention relates to an integral pontoon for a watercraft, and a technique for manufacturing the integral pontoon using molding techniques for forming a skin-foam structure.

2. Description of the Related Art

A variety of techniques may be used for floating pontoon watercraft. Traditionally, a deck structure was mounted on a flotation made of wood. For example, a floatable platform could be formed by bounding together a number of logs, or a watercraft hull could be formed by applying slats of wood over a structural frame. However, these structures were typically very bulky, tended to leak and rot, required significant maintenance, and had limited contours and configurations. Fortunately, modern manufacturing techniques and a variety of materials have largely replaced the traditional wood structure.

Some flotation devices, and watercraft components, have been manufactured from metals such as aluminum. For example, aluminum hulls are common for small fishing boats. Similarly, pontoon boats generally have metallic pontoons, or elongated flotation members, which are formed as hollow cylinders having aluminum or other metallic shells. Relative to the traditional wood structures, metal provides greater strength, eliminates problems with rot and porosity of the wood, allows greater control over boat contours, and allows the creation of pontoons having a hollow core. While these metal structures have advantages over the traditional wood structures, the metallic pontoons are generally very bulky, difficult to transport, expensive to make and repair, corrosive, and are difficult to form in aerodynamic contours for performance in the water. Furthermore, metal pontoons generally have at least two sections bonded together to form a closed structure, and potentially leak through seams or punctures in the metal shell.

Currently, most of the marine industry utilizes fiberglass in boat hull designs particularly for recreational boats. To form a fiberglass boat hull, an outer shell is formed, typically over an open die, by laying or spraying fiberglass strands or fabric on the die along with a polymeric resin. The fabric and fiber content of specific regions may be carefully controlled to provide the necessary structural integrity and for supporting fittings, reinforcing components, and the like. Once the resin is cured, the resulting structure is removed from the die and finished by trimming the fiberglass and resin, and by assembling the component with other components and subassemblies of the final product.

While traditional fiberglass construction techniques provide good structural strength and water tight properties, there are drawbacks. For example, conventional fiberglass fabrication techniques are relatively time consuming and labor intensive. Moreover, products used in forming the fiberglass composite structure require special handling and disposal, adding further to the cost of manufacturing. Depending upon the size of the watercraft and its outer configuration, fiberglass structures may require stringers, reinforcing plates, and other structural elements to provide the necessary stiffness and resistance to flexure and impact.

In addition, while the fiberglass provides a watertight shell, the shell is somewhat susceptible to puncture or fracture in a situation where the watercraft becomes grounded or strikes a submerged object. Because the fiberglass itself provides no additional buoyancy, lightweight components are commonly added to the watercraft, such as between the hull and interior walls or deck sections, further adding to the cost of the final product.

Despite the widespread use of fiberglass for boat hulls, pontoon boats generally continue to use metals, such as aluminum, to form the pontoons. While fiberglass is particularly well suited for boat hull designs, pontoons are closed structures. Fiberglass is generally applied to an open die to form a smooth outer surface having features of the die. Accordingly, an alternative technique to conventional fiberglass construction is needed for pontoons.

Other techniques have been proposed, but there are unfortunate drawbacks for pontoon construction. For example, it has been proposed to manufacture small watercraft such as canoes of moldable plastic materials. In one known technique, a boat hull is rotationally molded of layers of crosslinked and non-crosslinked polyethylene in an open mold. The technique produces a composite structure made up of outer and inner layers of dissimilar materials. However, this technique seriously limits the ability to recycle any of the material. Moreover, the use of an open mold presents difficulties in maintaining any control over local or overall thickness in the resulting product, and introduces potential for warping and drawing of the product during cooling cycles.

Accordingly, it would be desirable to provide an improved pontoon for watercraft, and a technique for fabricating the pontoon, which is both economical and avoids the drawbacks of such existing approaches. For example, it would be desirable to provide an integral flotation device (e.g., pontoon) having a skin-foam structure and features integrated into the skin of the flotation device. It would also be desirable to provide a pontoon having a uniform skin, which is non-corrosive, easily repairable, and has aerodynamic contours.

SUMMARY OF THE INVENTION

The present technique features a molded component for a watercraft, wherein the component has a shell and an inner foam layer. The molded component may have a plurality of surface features and structures integrally formed in the shell, which may have desired structural characteristics and properties depending on the material and controllable parameters of a molding process. For example, the skin may be composed of a plastic or other moldable materials and structural additives. The inner foam layer is distributed about an inner surface of the shell and may have desired properties depending on the material and technique for foaming the material. Accordingly, the technique is particularly well suited for flotation devices, such as pontoons, for the watercraft.

For example, the present technique may involve a flotation system for a watercraft. In an exemplary embodiment, the system may feature an enclosure having integral structural features formed by a skin. The enclosure also may have an interior foam coupled to the skin. Depending on the particular application, the integral structural features may form a mounting structure, which may be configured for coupling to the watercraft.

The present technique also provides a novel structure for a watercraft. In an exemplary embodiment, the watercraft may feature a watercraft structure and a closed shell configured for floating the watercraft structure. A skin may define the closed shell, which may have a foam coupled to the interior of the skin. The skin also may define an integral mounting structure configured for supporting a portion of the watercraft structure.

The present technique may also involve a method of forming a watercraft. In an exemplary embodiment, the method may feature rotating and heating a closed mold having a charge of material introduced therein, and spreading the material about an inner mold surface of the closed mold. The method also may feature distributing and foaming a second material, introduced into the closed mold, about a surface of the material. Also, the method may involve removing an integral flotation structure from the closed mold, and coupling it to a watercraft structure. Advantageously, the integral flotation structure may have a skin of the material and a foam of the second material coupled to the skin.

BRIEF DESCRIPTION OF THE DRAWINGS

The foregoing and other aspects of the invention will become apparent upon reading the following detailed description and upon reference to the drawings in which:

FIG. 1 is a perspective view of a watercraft having certain components fabricated in accordance with the present technique;

FIG. 2 is a perspective view of an exemplary pontoon for the watercraft;

FIG. 3 is a side view of the exemplary pontoon;

FIG. 4 is a perspective view of an integral mounting structure of the exemplary pontoon, and a securement assembly for mounting a deck structure of the watercraft;

FIG. 8 is a cross-sectional view of the closed mold illustrating formation of a skin layer;

FIG. 9 is a cross-sectional view of the closed mold illustrating formation of a foam layer over the skin layer;

FIG. 10 is a cross-sectional view of the closed mold illustrating a skin layer and a foam layer of desired thickness.

DETAILED DESCRIPTION OF SPECIFIC EMBODIMENTS

Figure 5:
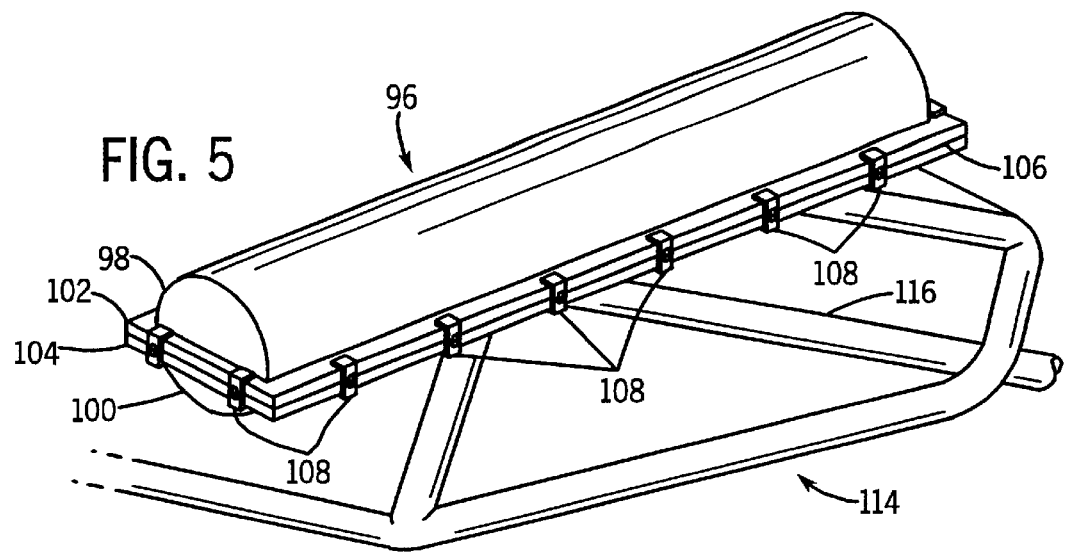
FIG. 5 is a perspective view of a closed mold and rotational support structure for rotationally molding the exemplary pontoon.

Turning now to the drawings and referring first to FIG. 1, a watercraft 10, in the form of a recreational boat, is illustrated that includes certain components fabricated in accordance with the present technique. As illustrated, the watercraft 10 has a deck structure 12 coupled to pontoons 14 and 16. Advantageously, the pontoons 14 and 16 may both be manufactured as a skin-foam structure according to the technique described below. Certain components of the deck structure 12 also may be fabricated with the present technique, but in this exemplary embodiment, the deck structure is formed by the more conventional construction techniques.

The deck structure 12, which may embody a variety of configurations and features, generally has a cabin 18 formed by a base 20 and wall sections 22, 24, 26 and 28 extending from the base 20. The cabin 18 may have a variety of fixtures, optional features and configurations, such as benches, tables, storage compartments, openings in the wall sections, railing, an electrical system and lighting, a steering and control system for a propulsion system, and an overhead cover assembly. For example, the cabin 18 may have benches 30 and 32 adjacent to the wall section 24 and an opening 34 extending through the wall section 28. Furthermore, the watercraft 10 may have a variety of propulsion systems, such as an inboard motor, an outboard motor, or a jet propulsion system. For example, an outboard motor may be coupled to the wall section 22, or to a mounting assembly at the wall section 22.

It should be noted that, while in the present discussion reference is made to a single pontoon in the form of pontoons 14 and 16 being manufactured by a skin-foam rotational molding technique, various other watercraft components may be fabricated in accordance with the same teachings. For example, as noted above, the deck structure 12, or fixtures and components in the cabin 18, may be fabricated in accordance with the technique, either integral with other parts or separately for subsequent assembly with the other parts. Furthermore, the present technique is in no way limited to personal or recreational watercraft. Rather, the technique may be applied to various structures including utility craft, floating platforms, buoys, fenders, pontoons for other applications such as helicopters and airplanes, and so forth. Thus, as used herein, the term "watercraft" is intended to include any and all marine components, particularly, but not limited to, floating components.

FIGS. 2, 3 and 4 illustrate certain physical features of the pontoon 16 that maybe integrally molded into the pontoons 14 and 16 as described below. Referring now to FIG. 2, the pontoon 16 is formed in a generally elongated shape advantageously contoured and streamlined by the present technique to facilitate propulsion of the watercraft 10 through the water. Various surface features, such as ribs, mounting structures and receptacles, and other functional features may be molded integrally into the pontoon during the molding process. In the illustrated embodiment, the pontoon 16 is an elongated member having a front portion 34, a rear portion 36, a top portion 38, a bottom portion 40, and opposite sides 42 and 44.

At the rear portion 36, the pontoon 16 has a step assembly 46 partially integrated into the skin-foam structure of the pontoon 16. Advantageously, the pontoon 16 has a step 48 integrally recessed into an upright surface 50, and a substantially horizontal portion 52 extending rearwardly from the upright surface 50 to form a step 54. The pontoons 14 and 16 also have an integral mount area 56 recessed into the substantially horizontal portion 52, to which an optional ladder 58 may be coupled by an appropriate securement assembly. Pontoon 14 does not have the optional ladder 58, while pontoon 16 includes the optional ladder 58 to provide additional steps for the pontoon 16. The optional ladder 58 may have a number of sections, hinges between the sections, and may be wholly or partially retractable.

In addition to the step assembly 46, the pontoons 14 and 16 may have other integral features and structures. For example, the top portion 38 may have a plurality of deck supports 60 extending outwardly from the top portion 38. The deck structure 12 may then be mounted to the deck supports 60 on each of the pontoons 14 and 16. As illustrated, the plurality of deck supports 60 embody a series of separately spaced I-shaped protrusions. However, the deck supports 60 may form a single protrusion in a desired shaped, or a series of other shapes protruding from the top portion 38 at desired locations.

The pontoons 14 and 16 may also have structural ridges, ribs or other features to modify the flow performance, strength or other characteristics of the pontoons 14 and 16. For example, the pontoons 14 and 16 have ridges 62 and 64 extending from the step 54 forwardly along opposite sides 42 and 44, respectively, and upwardly towards the top portion 38. A set of integral fenders 66 also may be formed on opposite sides 42 and 44 of the pontoons 14 and 16, and may extend from the rear portion 36 to the front portion 34. At the bottom portion 40, the pontoons 14 and 16 may have a variety of surface configurations for enhancing flow performance and handling in a body of water. For example, the bottom portion 40 may be V-shaped, U-shaped or contoured for particular performance characteristics. The bottom portion 40 also may have ribs for increased rigidity or for channeling the water flow. Advantageously, the present technique allows a variety of complex contours, ridges, shapes and configurations to be seamlessly molded into the pontoons 14 and 16, allowing improved performance of the pontoons 14 and 16.

FIG. 3 is a side view of the pontoon 14, illustrating the general shape or contour 68 of the bottom portion 40 of the pontoons 14 and 16. Advantageously, the contour 68 slopes upwardly towards the front portion 34 and the rear portion 36, at which point the contour 68 forms a forward contour 70 and a rear contour 72, respectively. As illustrated, the forward contour 70 extends to a nose 74 of the pontoon 14, spanning a substantially longer distance than the rear contour 72. Although this configuration may be particularly well suited for forward motion through a body of water, other configurations and contours are contemplated depending on the particular application and direction of flow.

FIG. 4 is a perspective view of one of the exemplary mounting structures 60 illustrated in FIGS. 2 and 3. As noted above, the mounting structure 60 protrudes from the top portion 38 in an I-shape integrally part of the pontoons 14 and 16. Although the configuration may vary, the mounting structure 60 has a support surface 76 and lateral receptacles 78 for mounting the deck structure 12. The support surface 76 is configured to support the load, or at least part of the load, of the deck structure 12, while the receptacles 78 are configured to secure the deck structure 12 to the pontoons 14 and 16. Accordingly, the deck structure 12 may be secured to the support surface 76 by a clamp 80, which may be secured to the deck structure 12 by a bolt 82 extending through a receptacle 84 of the deck structure 12 and into a threaded receptacle 86 of the clamp 80. A plurality of these clamps 80 may be secured to the deck structure 12 in a similar manner, the number corresponding to the number of receptacles 78 for the plurality of mounting structures 60. The clamps 80 are then positioned about the receptacles 78, and a set of receptacles 88 and 90 of the clamps 80 are aligned with the receptacles 78 to receive a bolt 92. The bolt 92 is then extended through the receptacles 88, 78 and 90, and a nut 94 securely couples the clamps, 80 to the mounting structure 60.

Alternatively, the mounting structure 60 may have receptacles entering through the support surface 76 for directly securing the deck structure 12 to the pontoons 14 and 16. However, the technique described above advantageously disposes the receptacles 78 laterally through the protruding I-shape of the mounting structures 60. This configuration may enhance the structural integrity of the mounting structure 60, and may reduce stresses, fatigue and other shortcomings of directly securing the deck structure 12 to the support surface 76. Other configurations are also contemplated, and may vary depending on the application and configuration of the deck structure 12.

In an exemplary embodiment, the pontoons 14 and 16 are formed in a closed mold 96 as shown generally in FIG. 5. As illustrated, the closed mold 96 is formed of a set of mold sections 98 and 100 designed to fit and cooperate with one another to define the outer surfaces of the molded pontoons 14 and 16. The mold sections 98 and 100 have flanges 102 and 104, respectively, extending about the perimeter of the mold sections 98 and 100 to form a joint line 106 for securing the mold sections 98 and 100. During the molding process, a plurality of clamps 108 are provided to securely couple the mold sections 98 and 100 about the flanges 102 and 104, respectively. Within the closed mold 96, the mold sections 98 and 100 define a mold cavity 110 having the desired contours and dimensions of the final pontoon (see FIGS. 8–10). Thus, the contours of mold cavity 110 will generally form a surface 112 of the pontoon (e.g., pontoon 14 or 16) illustrated in FIG. 6.

It should be noted that various designs of molds and dies may be used in the present technique. The mold sections shown in FIG. 5 are generally suitable for formation of an elongated flotation device, or the pontoons 14 and 16. Contours that are more complex may, of course, be accommodated by appropriately configuring the mold cavity as defined by the mold sections. Additional mold sections may be employed for geometries that are more complex. The molds may be made of any suitable material, and preferably provide the desired surface texture for the surface 112.

Figure 6:
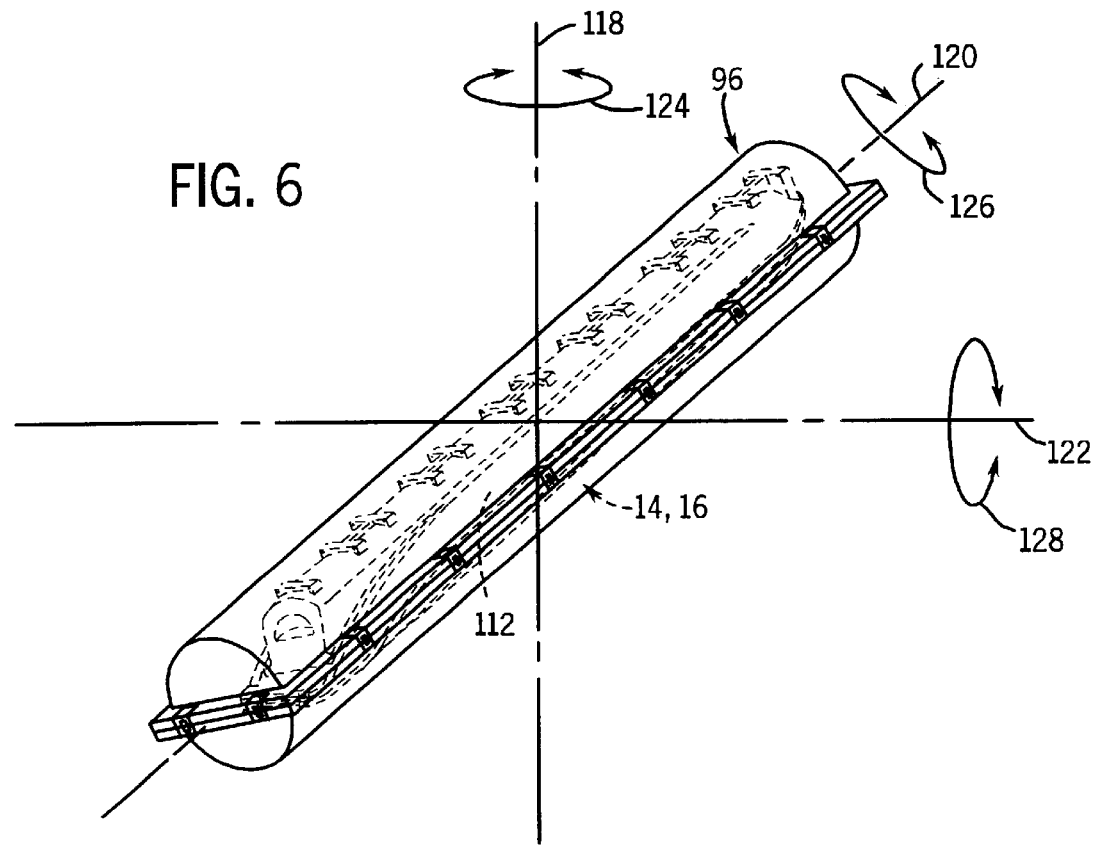
FIG. 6 is a perspective view of the closed mold illustrating the rotational axes and rotation provided to distribute material within the closed mold.

Employing molds of the type illustrated in FIG. 5, the pontoon in accordance with the present technique may be formed by a rotational molding process. This process is based upon the introduction of a moldable plastic charge into a mold cavity such as that shown in FIGS. 8–10, followed by heating and rotation of the closed mold. As illustrated in FIGS. 5 and 6, the closed mold 96 is supported in a rotational support structure 114 which facilitates rocking and rolling motion of the closed mold 96 to distribute the plastic material charged within the mold cavity.

The particular configuration of the rotational support structure 114 will, of course, vary according to the configuration of the desired component (e.g., the pontoon) and the mold sections. However, the rotational support structure 114 generally provides mechanical support for the mold sections 98 and 100 and the pontoon during the molding process, while permitting the mold sections 98 and 100 to be readily secured to one another to close the mold cavity 110, and to be removed from one another for release of the molded pontoon. One or more rotational spindles, as indicated generally at reference numeral 116, are provided to facilitate rotational of the closed mold 96 in a rotational molding oven (not shown) of generally conventional design.

Once the closed mold 96 is introduced into the rotational molding oven, the closed mold 96 may be rotated along mutually orthogonal axes 118, 120 and 122 to form the surface 112 of the pontoon as illustrated in FIG. 6. This rotation, as noted by reference numerals 124, 126 and 128, may be adapted, depending upon the particular component geometry, to insure that the plastic charges reach and extend over the regions of the closed mold 96 to create the desired thickness of the molded article (e.g., the pontoon) described above. Thus, as will be appreciated by those skilled in the art, the rotation illustrated in FIG. 6 may include various rotational speeds, dwells, and combinations of multi-axis rotation for adequate distribution within the mold cavity 110 and coverage of the mold cavity 110.

The present technique facilitates formation of pontoons 14 and 16, and thus the watercraft 10, by creation of a skin-foam cross-sectional structure as illustrated in FIGS. 9 and 10. The structure may be molded integrally to include the various features described above (e.g., the surface 112, FIG. 6), and other desired features. The structure is generally defined as a composite body, having an outer skin layer(s) and an intermediate structural foam layer(s). The skin and intermediate foam may have uniform thickness, density and other characteristics throughout the structure, or one or more of these layers may vary in thickness and contour to define the desired features, both on the inside and on the outside of the pontoon. Furthermore, the skin layer may comprise a plurality of skin layers and/or materials, each having desired properties, thickness, and other characteristics. The foam layer may also comprise a plurality of foam layers, each having desired materials, properties, thickness, density and other characteristics. Advantageously, the foam layer may be distributed throughout the pontoons 14 and 16 to fill the pontoons 14 and 16 with foam.

Figure 7:
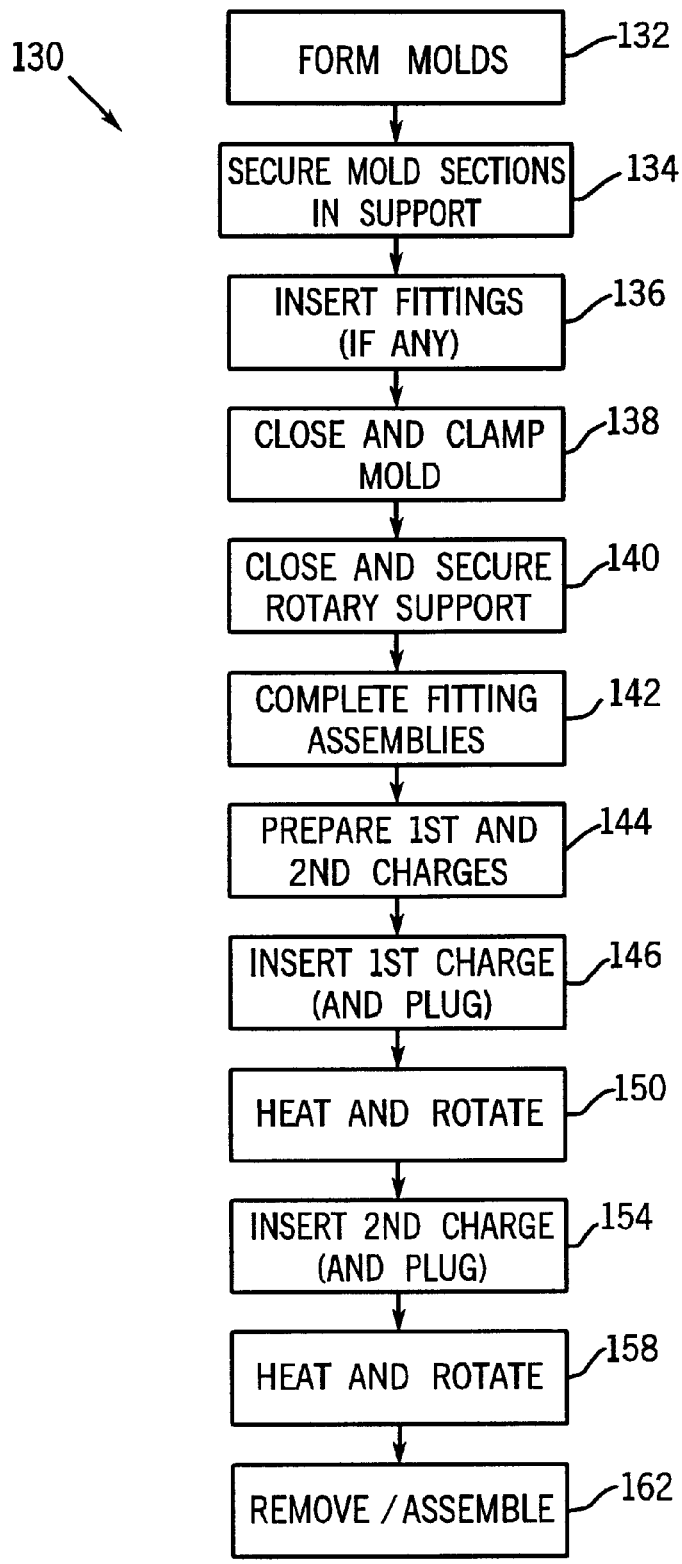
FIG. 7 is an exemplary flow chart for carrying out a rotational molding process in accordance with the present technique.

FIG. 7 is an exemplary flow chart for carrying out a rotational molding process 130 for the present technique. As follows, the rotational molding process 130 will be described in detail with reference to FIGS. 8–11. The molding process 130 may begin with the formation of molds 132, such as the closed mold 96 having mold sections 98 and 100. Although the molds may vary, the molds may have cross-sections defining a mold cavity having an inner surface for molding the pontoon. For example, the mold sections 98 and 100 have cross-sections defining the mold cavity 110, as illustrated in FIGS. 8–10. As noted above, the mold cavity 110 has an internal surface conforming to the desired geometry (e.g. the surface 112, FIG. 6) of the pontoons 14 and 16.

After forming the molds 132, the molds are secured in the support structure 134. For example, the mold sections 98 and 100 may be secured in the rotational support structure 114 as discussed above. The support structure may include hinged sections permitting the mold sections to be separated from one another without removal from the support structure. Alternatively, the support structure may have sections that are completely removed from one another, and which are brought together for the introduction of the mold into the rotational molding oven.

Depending on the particular application, various fittings, substructures, supports, and so forth may be provided in the mold 136. These fittings may form an integral part of the composite body by molding one or more skin layers, and a portion or the entire foam layer around the fitting. A wide variety of such fittings may be employed and integrated into the pontoon, and the particular manner in which they are installed and supported in the molds will generally be dictated by their geometry and that of the mold cavity in the region where they are installed.

The molds are then closed and clamped 138 to seal the mold sections defining the mold cavity (e.g., mold cavity 110). The rotational support structure is closed and secured 140 around the mold to support the mold and the pontoon during the molding process. If additional fittings are required to complete the previous fitting insertion 136, additional fittings may be installed or completed 142. For example, fittings having inner and outer sections may be secured or supported in the mold from both interior and exterior positions.

After or while the molds and rotational support structure are being prepared for material injections, a number of material charges may be prepared for introduction into the mold cavity 110. For example, first and second charges of moldable plastic material may be prepared 144. The first plastic charge may comprise a material adapted to define the surface 112, or skin, by depositing the material against the interior surface of the mold cavity 110. Although only: one charge may be required to define the outer surface, a plurality of charges may be prepared to create an outer skin layer. The second charge, introduced subsequently, is advantageously adapted to create a structural foam layer coupled to the outer skin. Both charges may be made of the same base material, such as recyclable non-crosslinked polyethylene or a polyolefin. The second charge includes a foaming or blowing agent that, under the elevated temperature conditions existing in the rotational molding oven, forms a closed-cell structural foam which is integrally bound to the skin layer(s). The desired density of the foam layer of the composite structure may be controlled by selection of the foaming agent, and by regulation of the relative quantity of the agent in the mixture of the second charge. The foaming agent may comprise a variety of substances, such as a zinc styrate. While any suitable foaming agent may be employed, a commercially available agent from Witco Corporation of Greenwich, Conn. under the designation Ficel has been found to provide suitable results.

The first and second charges of plastic material may be provided separately and injected into the mold cavity 110 in any suitable manner. However, in an exemplary embodiment, the charges are provided in insulated containers (not shown) supported on the rotational support. Introduction of the charges into the mold cavity 110 may be controlled by a simple valve structure generally known in the art. Accordingly, the first charge is introduced 146 into the mold cavity 110, which is then closed or plugged. For example, the mold cavity may have a valve or gate to prevent outflow of the charge during the molding process. FIG. 8 is a cross-sectional view of the closed mold 96, having a first charge 148 introduced into the mold cavity 110.

The mold is then heated and rotated 150 in a rotational molding oven to distribute the first charge 148 within the mold cavity 110. As illustrated in FIG. 8, heating of the mold melts the first charge, and rotation of the mold distributes the charge along the peripheral surfaces of mold cavity 110. Accordingly, a skin layer 152 begins to accumulate along the mold cavity 110 to define the surface 112 of the pontoon. As the first charge flows within the mold cavity 110, the skin layer 152 increases in thickness inwardly, as noted by arrows A in FIG. 8. Following the first charge, additional charges of the same or different material may be introduced to supplement the first charge in forming the skin layer 152. Either way, a desired thickness of the skin layer(s) 152 may be easily controlled by the technique, and may differ considerably in various regions to form the outer features described above, and to present desired structural properties and buoyancy.

As noted in FIG. 7, following the formation of skin layer 152, the second charge is introduced into the mold cavity 154. FIG. 9 is a cross-sectional view of the closed mold 96 having the skin layer 152 formed by the first charge 148, and illustrating a second charge 156 introduced into the mold cavity 110. Again, such introduction may be automated by a remote controllable gate or valve supported on the rotational structure and associated with an insulated container in which the second charge is deposited. Accordingly, the second charge is permitted to flow into the mold cavity, and the mold cavity is again plugged or closed to prevent outflow of the second charge during molding.

The mold is then heated and rotated 158 to melt the second charge 156, to promote gasification of the foaming agent, and to distribute the second charge throughout the mold cavity 110 over the skin layer 152. FIG. 9 illustrates the expansion of the second charge 156, creating a foam layer 160, or intermediate foam, within the mold cavity 110 during this phase of the process. As noted above, the second charge of plastic material introduced into the mold cavity includes a foaming or blowing agent. As the second charge 156 is distributed within the remainder of the mold cavity 110, defined now by the skin layer 152, the foaming agent begins to cause the second charge 156 to expand as it is melted and fused to the skin layer 152. Accordingly, the foam layer 160 expands inwardly towards a central region of the mold cavity 110, closing in and filling the mold cavity 110 as indicated by arrows B in FIG. 9. The foam layer 160 is permitted to grow in this manner until a desired thickness is achieved, as illustrated in FIG. 10.

Figure 11:
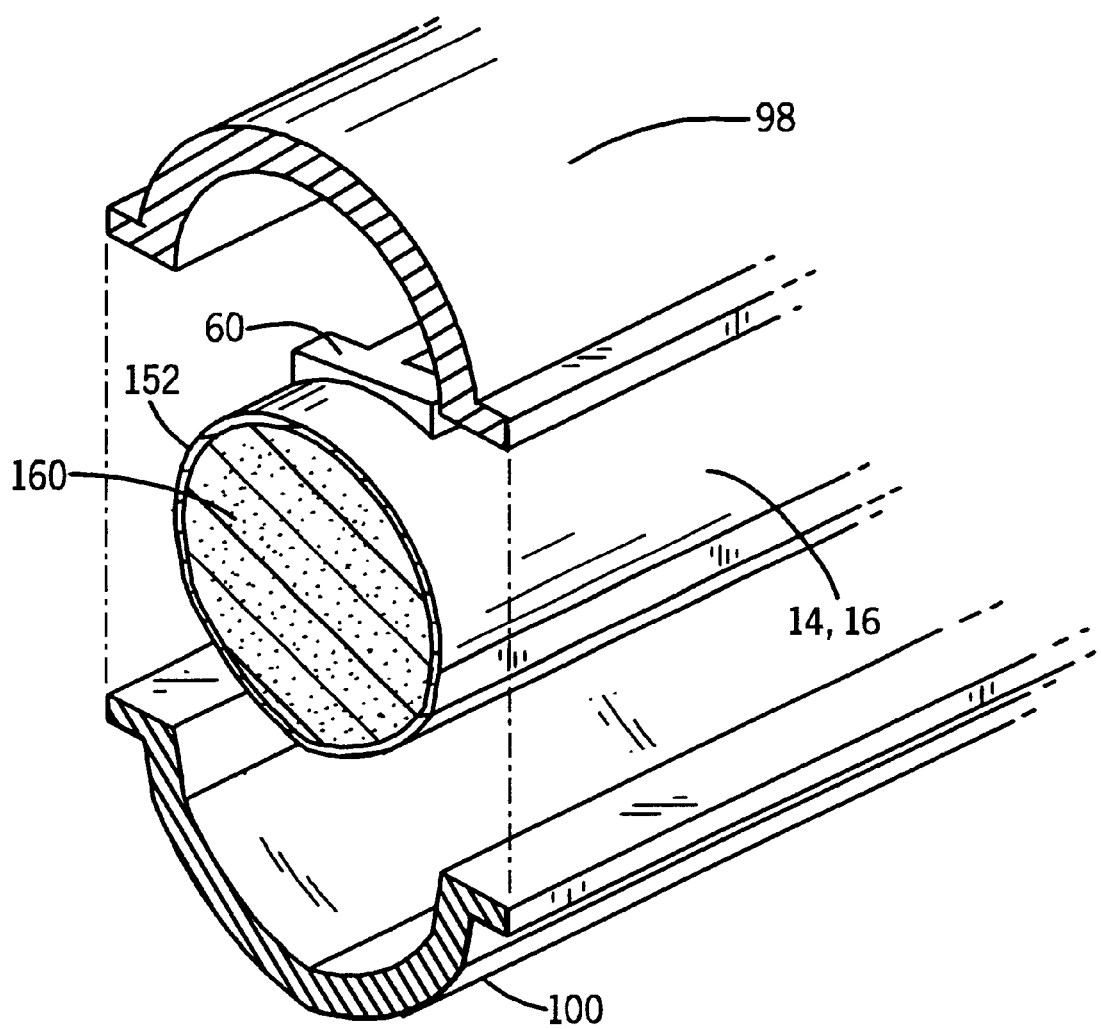
FIG. 11 is a cross-sectional view similar to that of FIG. 10, showing the growth of a structural foam layer between the skin layers to ultimately define the structure illustrated in FIG. 5.

Although the second charge 156 may be injected in an amount necessary to achieve the desired thickness, the second charge 156 may be injected into the mold cavity 110 until the entire mold cavity 110 is filled with the foam. FIG. 11 illustrates the foam layer 160 completely filling the mold cavity 110 inside the skin layer 152. Again, the residence time and the heat provided 158, as noted in FIG. 7, facilitates control of the growth and density of the foam layer 160 in the composite structure. The appropriate heat and residence time will generally be determined empirically for each article (e.g., pontoon), depending upon the article size and dimensions.

As noted in FIG. 7 and illustrated in FIG. 11, the mold is removed from the rotational molding oven, cooled, and the pontoon (e.g., pontoon 14 or 16) is removed from the mold and assembled 162. FIG. 11 is a perspective view of the mold sections 98 and 100 being separated after the rotational molding process to reveal a pontoon having desired features, which were defined by the mold sections 98 and 100. Advantageously, the pontoon has the surface 112 (see FIG. 6), the skin layer 152, and the foam 160 completely filling the pontoon inside the skin layer 152. It should be noted that, while the mold may be removed from the rotational molding oven during the intermediate stages of the process described above, in a presently preferred embodiment, once introduced into the oven, the introduction of the first and second charges into the mold cavity, and formation of the skin and foam layers, proceeds without removal of the mold from the oven. Cooling of the mold may also take place within the oven, and proceed further following its removal from the oven. Again, the desired cooling times and temperature/time profiles will generally be developed for the specific component size and configuration.

In an exemplary embodiment, the skin layer(s) 152 is formed of moldable plastic materials having desired properties from the points of view of manufacturing, use and disposal. The foam, or foam layer 160, may be formed from the same moldable plastic material as the skin layer 152, but with the addition of a foaming agent such as zinc styrate causing the network of interstices in the plastic to expand. In particular, the skin layer 152 is made of a disposable, recyclable plastic material, such as non-crosslinked polyethylene. Such materials are commercially available from a number of sources, such as Exxon Chemical Canada, under the commercial designation Escorene. Any suitable grade of moldable plastic material may be employed, including low, medium and high density polyethylene, as well as suitable grades of other polymers. In addition, the layers of the composite body may be associated with other materials, including surface materials, coatings, paints and the like to provide desired surface textures, graphics and so forth.

Again, the distribution and thickness of the materials throughout the pontoon may be easily controlled by the technique, and may differ considerably in various regions to form the outer features described above, and to present desired structural properties and buoyancy. Accordingly, the technique facilitates manufacture and control of not only the composition and thickness of the individual layers, but of the overall cross-sectional thickness of regions of the resulting structure.

As mentioned above, various fixtures and support structures may be integrally molded into the watercraft component through the foregoing molding process. For example, fittings may be installed in one or both of the mold sections prior to closure of the mold, and may be held in place from an outer access point. Through the molding process described above, the skin and foam layers are caused to flow around the fittings, integrally embedding them in the composite structure. Furthermore, a reinforcing structure, or series of reinforcing members, may be embedded in a similar manner. Like the fixtures, the reinforcing structure may be installed prior to closure of the mold sections, and the composite materials may be permitted to flow around the structure, completely embedding it in the pontoon during molding. As will be appreciated by those skilled in the art, a wide variety of support structures may be embedded in this manner, including plates for reinforcing a dive platform, reinforcing ribs and channel members, and so forth. Where desired, of course, reinforcing structures may be associated with fittings to permit securement of spars, cleats, and similar external structures to the molded article. In addition, plates or the like may extend fully to one or both layers (e.g., skin and foam layers) and may include internal anchoring surfaces to prevent their displacement or pull out from the molded pontoon.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A flotation system for a watercraft, the system comprising a pontoon having a skin of moldable plastic forming an integral enclosure having structural features, and a foam coupled to the skin and disposed within the integral enclosure, wherein the structural features comprise a mounting structure embedded within the moldable plastic skin, the mounting structure including a mounting load surface, a mounting securement surface, and a plurality of receptacles disposed at the mounting securement surface, the plurality of receptacles being configured to receive securement members for mounting a watercraft structure, wherein the mounting load surface is configured to support a load of the watercraft structure.

2. The system of claim 1, wherein the skin comprises a non-crosslinked polyethylene.

3. The system of claim 1, wherein the skin comprises a polyolefin.

4. The system of claim 1, wherein the skin comprises a recyclable material.

5. The system of claim 1, wherein the skin has a substantially uniform thickness.

6. The system of claim 1, wherein the skin comprises a rotationally molded layer of moldable plastic.

7. The system of claim 1, wherein the integral enclosure comprises an inner cavity having the foam distributed throughout the inner cavity.

8. The system of claim 7, wherein the foam is uniformly distributed throughout the inner cavity.

9. The system of claim 1, wherein the pontoon is a seamless close-molded construction having integral structures.

10. The system of claim 9, wherein the integral structures comprise an integral fender.

11. The system of claim 9, wherein the integral structures comprise an integral step.

12. The system of claim 9, wherein the integral structures comprise a surface structure configured to enhance performance of the pontoon in water.

13. The system of claim 1, wherein the pontoon has a structural profile configured for movement through a body of water.

14. A watercraft comprising:
a deck structure;
a plurality of pontoons configured for floating the deck structure, each of the pontoons comprising a skin of moldable plastic forming a uniform closed shell, a foam coupled to the skin within the uniform closed shell, wherein at least one of the pontoons further includes an integral fender formed within the skin.

15. The watercraft of claim 14, in the skin comprises a rotationally molded layer of plastic.

16. The watercraft of claim 14, wherein the foam is distributed throughout the uniform closed shell.

17. A watercraft comprising:
a deck structure;
a plurality of pontoons configured for floating the deck structure, each of the pontoons comprising a skin of moldable plastic forming a uniform closed shell, a foam coupled to the skin within the uniform closed shell, wherein at least one of the pontoons further includes an integral step formed within the skin.

18. The watercraft of claim 17, wherein the skin comprises a rotationally molded layer of plastic.

19. The watercraft of claim 17, wherein the foam is distributed throughout the uniform closed shell.

20. A method of forming a watercraft, the method comprising:
providing a closed pontoon mold;
placing at least one fitting into a fitting region within the closed pontoon mold;
introducing a first material into closed pontoon mold;
rotating the closed pontoon mold;
heating the closed pontoon mold;
distributing and fusing the first material about an inner surface of the closed pontoon mold to provide a first material layer, and embedding the fitting within the first material layer;
introducing a second material into the closed pontoon mold;
distributing and foaming the second material about a surface of the first material layer;
removing from the closed pontoon mold, an integral pontoon having a skin of the first material and a foam of the second material coupled to the skin; and
mounting a watercraft structure to at least one of the integral pontoons.

21. The method of claim 20, wherein the first material is a moldable plastic material.

22. The method of claim 21, wherein the moldable plastic material is polyolefin.

23. The method of claim 20, introducing a foaming agent configured for foaming the second material.

24. The method of claim 23, wherein the foaming agent is zinc styrate.

25. The method of claim 20, comprising cooling the closed pontoon mold.

26. The method of claim 20, wherein the acts of rotating and heating the closed pontoon mold comprise rotating and heating for predetermined times and at predetermined temperatures to achieve desired distribution and material characteristics.

27. The method of claim 20, comprising forming integral structures on the integral pontoon.

28. The method of claim 27, comprising forming an integral step structure.

29. The method of claim 27, wherein the at least one fitting is an integral support structure configured for mounting the watercraft structure, the method further including mounting the watercraft structure to the integral support structure.

30. The method of claim 29, wherein mounting the watercraft structure comprises bolting the watercraft structure to the integral support structure.

31. A method of forming a watercraft, the method comprising:
providing a closed pontoon mold;
providing a first charge of material;
distributing the first charge of material about an inner surface of the closed pontoon mold to provide an integral pontoon having a skin, the skin including an internal surface defining an internal volume, an external surface, and an integral support structure that projects outward from the external surface;
distributing an interior foam within the internal volume of the skin;
removing the integral pontoon from the closed pontoon mold;
supporting a watercraft structure with the integral support structure; and
coupling the watercraft structure to the integral support structure.

32. The method of claim 31, comprising molding an aerodynamic surface into the integral pontoon contoured for passage through water.

33. The method of claim 31, wherein providing the integral support structure includes the step of placing at least one fitting into a fitting region within the closed pontoon mold and embedding the fitting by distributing the first charge of material about the fitting.

34. The method of claim 31, wherein the first charge of material is a moldable plastic material.

35. The method of claim 34, comprising rotationally molding the skin from the first charge of moldable plastic material, and rotationally molding the interior foam from a second charge of moldable plastic material.

36. The method of claim 31, wherein the step of providing an integral pontoon having a skin further includes providing an integral step formed within the skin.

* * * * *

UNITED STATES PATENT AND TRADEMARK OFFICE
CERTIFICATE OF CORRECTION

PATENT NO.    : 6,516,736 B1
DATED         : February 11, 2003
INVENTOR(S)   : Van Lancker It is certified that error appears in the above-identified patent and that said Letters Patent is hereby corrected as shown below:

Column 11,
Line 30, "claim 14, in" should read -- claim 14, wherein --
Line 52, "first material into closed" should read -- first material into the closed --

Column 12,
Line 7, "claim 20, introducing" should read -- claim 20, further including the step of introducing --

Signed and Sealed this

Nineteenth Day of August, 2003

JAMES E. ROGAN
*Director of the United States Patent and Trademark Office*